(12) United States Patent
Susai

(10) Patent No.: US 9,798,660 B1
(45) Date of Patent: Oct. 24, 2017

(54) DATA EXCHANGE BETWEEN A MEMORY MAPPED INTERFACE AND A STREAMING INTERFACE

(71) Applicant: Xilinx, Inc., San Jose, CA (US)

(72) Inventor: Robert Bellarmin Susai, Hyderabad (IN)

(73) Assignee: XILINX, INC., San Jose, CA (US)

( * ) Notice: Subject to any disclaimer, the term of this patent is extended or adjusted under 35 U.S.C. 154(b) by 186 days.

(21) Appl. No.: 14/707,932

(22) Filed: May 8, 2015

(51) Int. Cl.
*G06F 12/00* (2006.01)
*G06F 12/08* (2016.01)
*G06F 3/06* (2006.01)

(52) U.S. Cl.
CPC ............ *G06F 12/08* (2013.01); *G06F 3/0608* (2013.01); *G06F 3/0625* (2013.01); *G06F 3/0638* (2013.01); *G06F 3/0655* (2013.01); *G06F 3/0683* (2013.01); *G06F 2212/1028* (2013.01); *G06F 2212/152* (2013.01); *G06F 2212/154* (2013.01); *G06F 2212/261* (2013.01)

(58) Field of Classification Search
None
See application file for complete search history.

(56) References Cited

PUBLICATIONS

Microsemi, CoreFIFO v2.0 Handbook, Mar. 2013.*
Xilinx, "LogiCORE IP AXI-4-Stream FIFO v4.0 Product Guide," PG080, Apr. 2, 2014, pp. 1-50, Xilinx, Inc., San Jose, California, USA.
Xilinx, "AXI-4-Stream FIFO v4.1 LogiCORE IP Product Guide," PG080, Apr. 1, 2015, pp. 1-53, Xilinx, Inc., San Jose, California, USA.

* cited by examiner

*Primary Examiner* — Adam M Queler
*Assistant Examiner* — Jason Blust
(74) *Attorney, Agent, or Firm* — Kevin T. Cuenot

(57) ABSTRACT

Data exchange between a memory mapped interface and a streaming interface may include receiving sub-packets of a packet from a first interface, storing the sub-packets within a memory at addresses determined according to a ratio of a width of the first interface and a width of a second interface, and determining occupancy, of the memory as the sub-packets are stored. Responsive to determining that the occupancy of the memory meets a trigger level, sub-packets may be read from the memory at addresses determined according to the ratio and sending the sub-packets using the second interface.

18 Claims, 6 Drawing Sheets

DATA EXCHANGE BETWEEN A MEMORY MAPPED INTERFACE AND A STREAMING INTERFACE

FIELD OF THE INVENTION

This disclosure relates to integrated circuits (ICs) and, more particularly, to data exchange between a memory mapped interface and a streaming interface.

BACKGROUND

Within modern digital systems, large amounts of data are transferred among different nodes. In many cases, the data is transferred between two different types of interfaces. An example of such a data transfer is the exchange of data between a memory mapped interface and a streaming interface. Data transmission between interfaces requires the use of memory. The memory temporarily stores a received data packet prior to forwarding the data packet on to another node in the digital system. The size of the memory needed to facilitate the data transfer is typically dictated by the size of the largest data packet that will be transmitted. Because a data packet is received in its entirety and stored in the memory prior to sending the data packet on to another node, the memory must be at least as large as the largest data packet to be processed.

Increasing levels of interaction between systems means that the amount of data being shared continues to grow. To support this increased data sharing, larger data packets are used, thereby requiring ever larger memories to facilitate the data transfers. The inclusion of larger memories within digital systems, however, tends to increase the size of the systems, the cost of implementing the systems, and the amount of power consumed by the systems.

SUMMARY

A method may include receiving sub-packets of a packet from a first interface and storing the sub-packets within a memory at addresses determined according to a width of the first interface. The method may include determining occupancy of the memory as the sub-packets are stored using a ratio of the width of the first interface and a width of the second interface. The method also may include, responsive to determining that the occupancy of the memory meets a trigger level, reading the sub-packets from the memory at addresses determined according to the width of the second interface and sending the sub-packets using the second interface.

A system may include a memory having a capacity less than a size of a packet, a memory mapped slave configured to receive sub-packets of the packet over a memory mapped interface and store the sub-packets to the memory, and a packet controller configured to read the sub-packets from the memory responsive to a trigger signal and send the sub-packets over a streaming interface. The system may include a monitor circuit coupled to the memory. The monitor circuit may be configured to generate a trigger signal responsive to determining that an occupancy of the memory meets a trigger level less than the capacity of the memory. The monitor circuit further may be configured to generate write addresses, according to a width of the memory mapped interface, provided to the memory mapped slave for writing the sub-packets to the memory, and generate read addresses, according to a width of the streaming interface, provided to the packet controller for reading the sub-packets from the memory.

A system may include a memory having a capacity less than a size of a packet, a packet controller configured to receive sub-packets of the packet over a streaming interface and write the sub-packets to the memory, and a memory mapped slave configured to read the sub-packets from the memory responsive to a trigger signal and send the sub-packets over a memory mapped interface. The system also may include a monitor circuit coupled to the memory. The monitor circuit may be configured to generate a trigger signal responsive to determining that an occupancy of the memory meets a trigger level less than a size of the packet. The monitor circuit further may be configured to generate write addresses, according to a width of the streaming interface, provided to the packet controller for writing the sub-packets to the memory and generate read addresses, according to a width of the memory mapped interface, provided to the memory mapped slave for reading the sub-packets from the memory.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIGS. 6-1 and 6-2, taken collectively, are a flow chart illustrating another exemplary method of exchanging data between interfaces.

DETAILED DESCRIPTION

Figure 1:
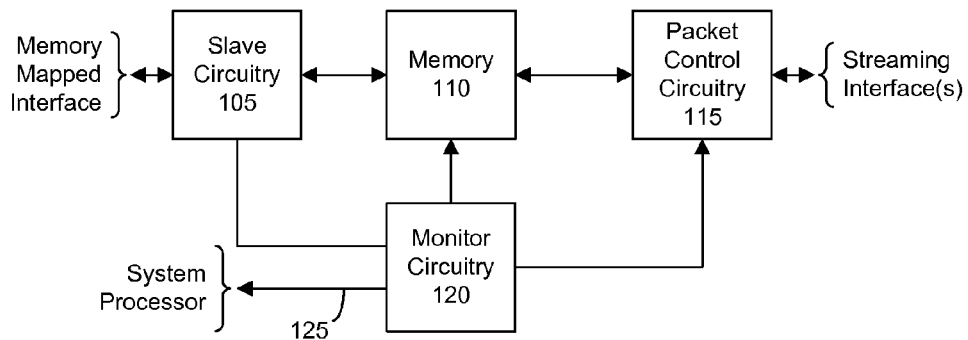
FIG. 1 is a block diagram illustrating an exemplary system for exchanging data between interfaces.

While the disclosure concludes with claims defining novel features, it is believed that the various features described within this disclosure will be better understood from a consideration of the description in conjunction with the drawings. The process(es), machine(s), manufacture(s), and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to data exchange between a memory mapped interface and a streaming interface. In accordance with the inventive arrangements described herein, packets may be exchanged between a memory mapped interface and a streaming interface. As portions of a packet, referred to herein as a sub-packet, are received from a first of the interfaces, the sub-packets may be stored in memory. Responsive to determining that an occupancy of the memory meets a particular trigger level, sub-packets stored within the memory may be sent using the second of the interfaces.

Data may be sent using the second interface without first receiving the entirety of the packet from the first interface. By sending sub-packets concurrently with the receipt of further sub-packets of a same packet, a smaller memory may be used to facilitate inter-interface data transfer. The memory, for example, may be smaller in capacity than the size of the largest packet to be exchanged between the interfaces. The memory size is not constrained by packet size.

The use of smaller capacity memories within a digital system to facilitate data exchange advantageously allows the digital system to be physically smaller in size. In addition, the digital system likely consumes less power. Further, the digital system may transmit data in less time, e.g., is faster, since data transmission using the second interface may begin prior to receiving the entirety of the packet from the first interface.

For purposes of illustration, consider an exemplary digital system that sends large packets of up to 64 KB in size. A system as described herein may include a memory that is smaller than 64 KB in size. For example, a memory having a capacity of 2 KB may be used. The trigger level may be set to a value less than 2 KB. As an example, the trigger level may be set to 1.5 KB. The system may begin receiving sub-packets of the packet. For purposes of discussion, a unit of data is referred to as a packet within this disclosure. As defined within this disclosure, the term "sub-packet" means a portion of a packet. A sub-packet is less than an entire packet. Responsive to the system determining that the amount of the packet received from a first of the interfaces and/or stored in the memory is at or above the trigger level, the system may begin sending the sub-packets using the second interface. For example, responsive to determining that an occupancy of the memory is 1.5 KB or more, the system may begin sending data from the memory, e.g., the sub-packets, using the second interface.

In one aspect, addressing for the memory may be controlled and/or determined using a monitor circuit. The monitor circuit, for example, may determine the width of each respective interface and, based upon the width determinations, generate read addresses and write addresses as appropriate for reading and writing data. By controlling addressing according to the widths of the respective interfaces, interfaces of different widths may be used and accommodated.

The inventive arrangements described herein may be implemented as a method or process performed by a system. The inventive arrangements also may be implemented as a system. Exemplary systems may include, but are not limited to, digital systems such as electronic circuits. The electronic circuit may be included within other larger systems such as ICs or the like. Other examples of systems that may implement and/or include the inventive arrangements described herein may include, but are not limited to, entertainment systems, televisions, media systems or consoles (e.g., audio, visual, and/or audiovisual), gaming consoles, computer systems including laptops, portable computers, tablets, etc., display devices, mobile communication devices including mobile phones, and the like.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an exemplary system 100 for exchanging data between interfaces. System 100 supports data exchange between a first interface and a second, different interface. System 100 supports bidirectional data flow so that data may flow from the first interface to the second interface and vice versa.

In one example, the first interface may be a memory mapped interface. A memory mapped interface may be a communication bus configured to carry read and write transactions. The read and write transactions include, or specify, a destination address. A memory mapped interface typically includes multiple channels. As an example, a memory mapped interface may include a write data channel, a write address channel, a write response channel, a read address channel, and a read response channel.

In another example, the second interface may be a streaming interface. A streaming interface may be implemented as a single channel where data flows in a single direction. Data may flow from a source to a destination. While data flow is in a single direction, handshake signaling between source and destination may be used. A streaming interface does not utilize destination addresses due to the single direction of the data flow. In order to support two-way communications, two streaming interfaces are used where a first streaming interface transmits data and the second streaming interface receives data.

Examples of memory mapped interfaces and streaming interfaces may include one or more interfaces that conform to the Advanced Microcontroller Bus Architecture (AMBA). AMBA is an open-standard, on-chip interconnect specification for the connection and management of circuit blocks in a system-on-chip (SOC) design. Advanced eXtensible Interface (AXI) 4 and AXI4-Lite are examples of memory mapped interfaces within the AMBA® family of interfaces. AXI4-Stream is an example of a streaming interface within the AMBA® family of interfaces. These interfaces are further defined within the "AMBA 4 AXI and ACE Protocol Specification" as provided by Arm Ltd of Cambridge, UK.

Referring again to FIG. 1, system 100 includes slave circuitry 105, a memory 110, packet control circuitry 115, and monitor circuitry 120. Slave circuitry 105 is coupled to a memory mapped interface, memory 110, and monitor circuitry 120. Packet control circuitry 115 is coupled to streaming interfaces, memory 110, and monitor circuitry 120. As pictured, monitor circuitry 120 is also coupled to memory 110.

Slave circuitry 105 may be configured to receive sub-packets from the memory mapped interface and store the sub-packets in memory 110. Packet control circuitry 115 may be configured to read sub-packets received from the memory mapped interface from memory 110, format the sub-packets for transmission using the streaming interface, and send the sub-packets using the streaming interface.

Packet control circuitry 115 may be configured to receive sub-packets via a streaming interface and store the sub-packets within memory 110. Slave circuitry 105 may be configured to read the sub-packets received from the streaming interface from memory 110, format the sub-packets for transmission using the memory mapped interface, and send the sub-packets using the memory mapped interface.

As used herein, the term "formatting" as applied to data such as sub-packets for transmission may include providing and/or generating the necessary control signals, e.g., handshake signals. Formatting may also include other operations such as including delimiters or other identifiers, etc., necessary for the particular interface over which the data is sent.

Memory 110, for example, may include a transmit section, or partition where sub-packets received from the memory mapped interface are stored and a receive section, or partition, where sub-packets received from the streaming interface are stored. In another aspect, separate memories may be used for transmission and reception of sub-packets to form memory 110.

Monitor circuitry 120 may be configured to perform a variety of operations. In one aspect, monitor circuitry 120 may track the amount of a packet that has been received in each of the transmit and receive directions. Monitor circuitry 120 may also store the size of a packet being transmitted in each of the transmit and receive directions. Further, monitor circuitry 120 may determine when each of the partitions or memories of memory 110 is empty and/or full. In certain circumstances to be described herein in greater detail, monitor circuitry 120 may generate one or more interrupt signals 125 to a system processor controlling various read and/or write transactions occurring over the memory mapped interface and streaming data transfers over the streaming interfaces.

In another aspect, monitor circuitry 120 may be configured to determine the occupancy of memory 110. Monitor circuitry 120 may determine the occupancy of each section, partition, or memory, as the case may be, independently. Monitor circuitry 120, for example, may generate a trigger signal responsive to determining that the occupancy of memory 110 is at or above a trigger level. Monitor circuitry 120 may generate a trigger signal independently for each of the transmit and receive partitions, sections, and/or memories as the case may be. As defined herein, term "occupancy," when used in reference to a memory, is an amount of data that is stored in the memory. The amount of data stored in the memory, for example, may be the amount of data received as sub-packets over a first interface that has not yet been read out of the memory for transmission using the second interface.

Responsive to receiving the trigger signal, for example, slave circuit 105 may begin reading sub-packets from memory 110, format converting the sub-packets, and sending the sub-packets over the memory mapped interface. Slave circuitry 105 may begin sending sub-packets of a packet prior to receiving the entirety of the packet.

Similarly, responsive to receiving the trigger signal, packet control circuitry 115 may begin reading sub-packets from memory 110, format converting the sub-packets, and sending the sub-packets over the streaming interface. Packet control circuitry 115 may begin sending sub-packets of a packet prior to receiving the entirety of the packet.

Figure 2:
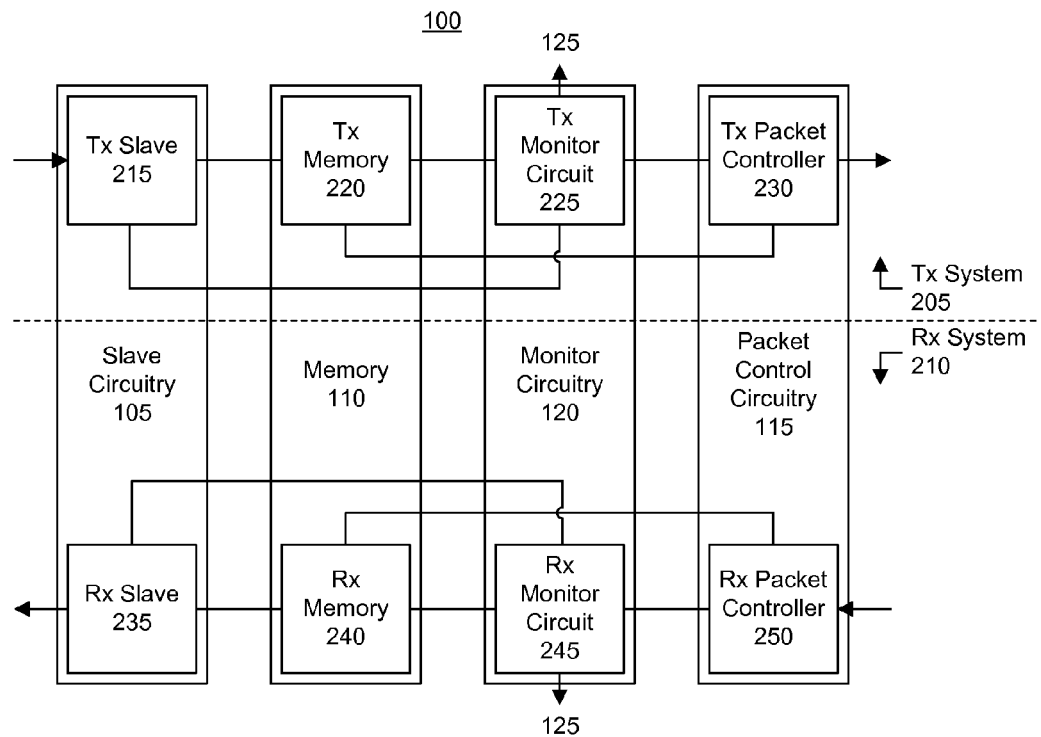
FIG. 2 is a block diagram illustrating an exemplary implementation of the system of FIG. 1.

FIG. 2 is a block diagram illustrating an exemplary implementation of system 100 of FIG. 1. As pictured, system 100 is illustrated as having a transmit (Tx) system 205 and a receive (Rx) system 210. In one aspect, Tx system 205 may operate concurrently with Rx system 210. Slave circuitry 105 includes Tx slave 215 and Rx slave 235. Tx slave 215 and Rx slave 235 may be implemented as memory mapped slaves.

Memory 110 may include a Tx memory 220 and an Rx memory 240. In one aspect, each of Tx memory 220 and Rx memory 240 may be implemented as a dual port, random access memory (RAM). In one example, each of Tx memory 220 and Rx memory 240 may be implemented using block RAM programmable circuit blocks that may be configured to have same or different bit widths on the read and write ports. Further, each of the read and write ports of the block RAM(s) may be clocked using a same or different frequency clock signal.

Monitor circuitry 120 may include a Tx monitor circuit 225 and an Rx monitor circuit 245. Each of Tx monitor circuit 225 and Rx monitor circuit 245 may be configured to generate interrupt signals 125. Packet control circuitry 115 may include a Tx packet controller 230 and an Rx packet controller 250.

In one exemplary implementation, monitor circuitry 120, including Tx monitor circuit 225 and Rx monitor circuit 245 may be located local to memory 110. For example, monitor circuitry 120 may be located adjacent to memory 110. Locating monitor circuitry 120 in close proximity to memory 110 facilitates greater control over reading and writing. As an example, a transaction may be received over the memory mapped interface or the streaming interface on the clock cycle immediately following the clock cycle in which a prior transaction completes without requiring any intervening clock cycles to begin receiving the next transaction.

Figure 3:
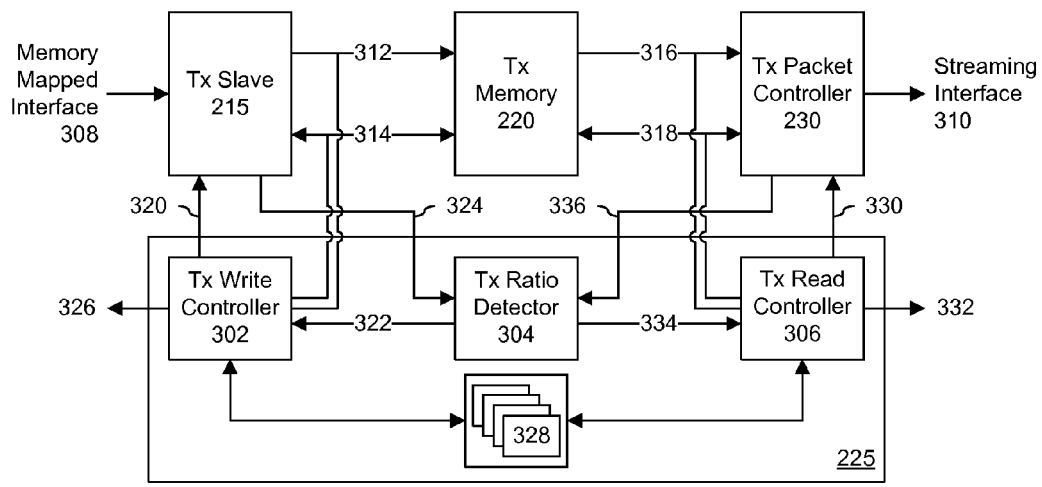
FIG. 3 is a block diagram illustrating an exemplary transmit system.

FIG. 3 is a block diagram illustrating an exemplary implementation of Tx system 205. Tx system 205 may be configured to transfer packets from a memory mapped interface to a streaming interface. As pictured, Tx system 205 may include Tx slave 215, Tx memory 220, Tx packet controller 230, and Tx monitor circuit 225. In this example, Tx monitor circuit 225 may include a Tx write controller 302, a Tx ratio detector 304, and a Tx read controller 306. Monitor circuit 225 further may include one or more registers 328.

Tx slave 215 is coupled to a memory mapped interface 308, Tx memory 220, and Tx monitor circuit 225. Tx slave 215 may receive sub-packets of one or more packets as part of one or more write transactions sent over memory mapped interface 308. Tx slave 215, for example, may be coupled to a write data channel, a write address channel, and a write response channel of memory mapped interface 308.

In the example of FIG. 3, Tx slave 215 may be coupled to a write port of Tx memory 220 through a plurality of signals. Tx memory 220 may be implemented as a multi-port RAM. Read and write ports of Tx memory 220 may be the same or different widths to correspond to memory mapped interface 308 and streaming interface 310. Further, the read and write ports may be clocked at a same frequency or a different frequency. Tx slave 215 may store sub-packets received from memory mapped interface 308 in Tx memory 220.

In one exemplary implementation, the size of Tx memory 220 may be smaller than the size of the largest packet that passes from memory mapped interface 308 to a streaming interface 310 through Tx system 205. As used herein, the term "size," when used in reference to a memory, means the capacity of the memory or the total amount of data that may be stored in the memory.

In one aspect, signal 312 may represent data signals. Signal 314 may represent one or more control signals.

Accordingly, Tx slave 215 may write the sub-packets to Tx memory 220 via signal 312. Tx slave 215 further may provide control signals to Tx memory 220 via signal 314. For example, Tx slave 215 may provide a write enable signal to Tx memory 220 as part of, or within, signal 314.

Tx packet controller 230 is coupled to streaming interface 310, Tx memory 220, and monitor circuit 225. In general, Tx packet controller 230 may read sub-packets from Tx memory 220. Tx packet controller 230 may format the sub-packet for transmission using streaming interface 310 and send the sub-packets as formatted.

In the example of FIG. 1, Tx packet controller 230 is coupled to a read port of Tx memory 220 through a plurality of signals. In one aspect, signal 316 may represent data signals. Signal 318 may represent one or more control signals. Accordingly, Tx packet controller 230 may read the sub-packets from Tx memory 220 via signal 316. Tx packet controller 230 further may provide control signals to Tx memory 220 via signal 318. For example, Tx packet controller 230 may provide a read enable signal to Tx memory 220 as part of, or within, signal 318.

Referring to monitor circuit 225, Tx write controller 302 may be coupled to Tx slave 215 through signals 314 and/or 320, Tx memory 220 through signals 312 and/or 314, and transmit ratio detector 304 through signal 322. In one aspect, Tx write controller 302 may be configured to generate Tx write addresses specifying where sub-packets are written within Tx memory 220. Tx write addresses generated by Tx write controller 302 may be provided to the write port of Tx memory 220 via signal 314, for example. Sub-packet data received by Tx memory 220 via signal 312 may be written at the Tx write address(es) provided by Tx write controller 302.

In one exemplary implementation, Tx write controller 302 may generate Tx write addresses by incrementing a Tx write address from a prior write operation by a Tx write increment amount specified by signal 322. As pictured, Tx ratio detector 304 may be coupled to Tx slave 215 by signal 324. Signal 324 may indicate a width of memory mapped interface 308. In one particular example, signal 324 may indicate the width of the write data channel coupled to memory mapped interface 308. The width may be specified as a number of bits, a number of bytes, or the like. Tx ratio detector 304 further may be coupled to Tx packet controller 230 through signal 336. Signal 336 may indicate a width of streaming interface 310. For example, signal 336 may indicate the width of streaming interface 310 specified as a number of bits, a number of bytes, or the like.

For example, Tx write controller 302 may receive a write enable signal from Tx slave 215 via signal 314. Tx slave 215 may generate the write enable signal responsive to receiving a write request and/or transaction over memory mapped interface 308. Responsive to receiving the write enable signal, Tx write controller 302 may increment the Tx write address stored therein by the Tx write increment amount specified by signal 322. The Tx write increment amount may be, for example, 1 byte, 2 bytes, 3 bytes, 4 bytes, 8 bytes, etc. based upon the width specified by signal 324 in order to provide correct Tx write addressing to Tx memory 220. Tx write controller 302 may provide the newly generated Tx write address to the write port of Tx memory 220 via signal 314. Data received by Tx memory 220 may be written to the Tx write address received from Tx write controller 302.

In another aspect, Tx write controller 302 may be coupled to registers 328 within monitor circuit 225. Registers 328 may be accessed, e.g., read and/or written, by Tx write controller 302 and/or Tx read controller 306. Registers 328, for example, may store values used by monitor circuit 225 to make one or more determinations and exercise control over one or more circuit blocks of Tx system 205. For example, registers 328 may include a register that stores a size of a current packet being received by Tx slave 215. The size of the current packet may be determined from the header information in the packet received by Tx write controller 302 and written to registers 328. Registers 328 may also include a register that stores an amount of the current packet received by Tx slave 215 at a current moment in time that is continually updated as determined by Tx write controller 302. In another example, registers 328 may include a register indicating a general status of whether a partial packet is received or an entirety of a packet has been received as determined and updated by Tx write controller 302. In one aspect, registers 328 may be large enough to support packet sizes of up to 2 Gigabytes in size.

In another example, Tx write controller 302 may store the current write address provided to Tx memory 220 within registers 328. For example, Tx write controller 302 may write the current write address to registers 328 each time a new write address is provided to Tx memory 220. Similarly, Tx read controller 306 may store the current read address provided to Tx memory 220 within registers 328. For example, Tx read controller 306 may write the current read address to registers 328 each time a new read address is provided to Tx memory 220.

As such, Tx write controller 302 may be configured to determine whether Tx memory 220 is full, empty, and/or the occupancy of Tx memory 220 by comparing the read address and the write address. Tx write controller 302 may determine whether Tx memory 220 is fully, empty, and/or the occupancy of Tx memory 220 on a continuous and/or periodic basis.

Tx write controller 302 may indicate to Tx slave 215 when Tx memory 220 is full through signal 320. In that case, Tx write controller 302 may generate an interrupt signal 326 that may be provided to a system processor that controls write transactions over memory mapped interface 308. Responsive to the interrupt, the system processor may discontinue the sending of data over memory mapped interface 308 to Tx slave 215 and/or implement other interrupt operations.

Tx read controller 306 may be coupled to Tx packet controller 230 through signals 318 and/or 330, Tx memory 220 through signals 316 and/or 318, and Tx ratio detector 304 through signal 334. In one aspect, Tx read controller 306 may be configured to generate Tx read addresses specifying the location within Tx memory 220 from which sub-packets may be read. Tx read addresses generated by Tx read controller 306 may be provided to the read port of Tx memory 220 via signal 318, for example. Sub-packet data read from Tx memory 220 via signal 316 is read from the read address(es) provided by Tx read controller 306.

In one exemplary implementation, Tx read controller 306 may generate Tx read addresses by incrementing a Tx read address from a prior read operation by a Tx read increment amount. As pictured, Tx ratio detector 304 may be coupled to Tx packet controller 230 by signal 336. Signal 336 may indicate a width of streaming interface 310. In one particular example, signal 336 may indicate the width of the data channel of streaming interface 310. The width may be specified as a number of bits, a number of bytes, or the like.

For example, Tx read controller 306 may receive a read enable signal from Tx packet controller 230 via signal 318. Responsive to receiving the read enable signal, Tx read controller 306 may increment the Tx read address stored therein by the Tx read increment amount specified by signal 334. The Tx read increment amount may be 1 byte, 2 bytes, 3 bytes, 4 bytes, 8 bytes, etc., determined according to the width of streaming interface 310. Tx read controller 306 may provide the newly generated read address to the read port of Tx memory 220 via signal 318. Data stored in Tx memory 220 may be read from the read address received from Tx read controller 306.

As pictured, Tx read controller 306 may be coupled to registers 328. As previously described, Tx read controller 306 may store the current read address within registers 328. Tx read controller 306 may be configured to determine whether Tx memory 220 is full, empty, and/or the occupancy of Tx memory 220 by comparing the read address and the write address. Tx read controller 306 may determine whether Tx memory 220 is fully, empty, and/or the occupancy on a continuous and/or periodic basis.

Tx read controller 306 may indicate to Tx packet controller 230 when Tx memory 220 is empty through signal 330. Tx read controller 306 may generate an interrupt signal 332 in cases where packet transmission is not complete and Tx memory 220 is empty. Interrupt signal 332 may be provided to a processor controlling read transactions over streaming interface 310. Responsive to the interrupt, the processor, for example, may discontinue sending data over streaming interface 310 by Tx packet controller 230 and/or implement one or more other interrupt operations.

In another aspect, registers 328 may include a register that stores a value specifying a trigger level. The trigger level is an occupancy of Tx memory 220 that, when reached or exceeded, causes Tx read controller 306 to initiate reading of sub-packets by Tx packet controller 230. As discussed, the capacity of Tx memory 220 may be less than the size of the largest packet to be processed. The trigger level may be set to an amount less than the capacity of Tx memory 220. Referring to the earlier example, Tx memory 220 may be 2 KB in size, while the trigger level may be set to 1.5 KB in size and the largest packet may be 64 KB. While 64 KB is used as an exemplary packet size, system 100 may support packet sizes of up to 2 GB.

For example, Tx read controller 306 may monitor the register indicating the occupancy of Tx memory 220. Responsive to the occupancy of Tx memory 220 being greater than or equal to the trigger level, Tx read controller 306 may instruct Tx packet controller 230 to begin reading sub-packets via signal 330. Tx packet controller 230, in response, may generate a read enable signal via signal 318. Tx read controller 306 may generate the necessary read addresses responsive to the read enable signal.

In one example, Tx ratio detector 304 may determine whether the width of memory mapped interface 308 or streaming interface 310 is greater. Tx ratio detector 304 may determine a ratio of interface widths. In cases where the interface widths are different, the ratio indicates that the width of the read and/or write addresses may require adjusting. The ratio, for example, may indicate whether to pad addresses, to truncate addresses, or do neither when determining whether Tx memory 220 is empty, full, and/or whether the trigger level is reached.

For example, consider the case where memory mapped interface 308 is 32 bits in width and streaming interface 310 is 64 bits in width. Tx ratio detector 304 may determine that streaming interface 310 is larger and determine that the ratio is 1 (for write) to 2 (for read) in Tx system 205. In this example, Tx slave 215 may view Tx memory 220 as 32 bits wide and 1 K entries deep. Tx packet controller 230 may view Tx memory 220 as 64 bits wide and 512 entries deep.

Tx write controller 302 may use write addresses occupying bits [0:9] (of an available 15 addressing bits) to write to Tx memory 220. Tx read controller 306 may use read addresses occupying bits [0:8] (of the available 15 addressing bits) to read from Tx memory 220. The widths of the address buses for reading and writing may be large enough to support a variety of different widths. When comparing read and/or write address for determining whether Tx memory 220 is full, empty, or whether the trigger level is reached, the addresses must be processed to have the same width.

In this regard, a ratio other than 1 to 1 indicates whether to pad and/or truncate the least significant bit of an address. For example, a ratio of 1 (write) to 2 (read) will cause Tx write controller 302, when obtaining the read address from registers 328, to pad a zero to the least significant bit of the read address so that the read address and the write address are the same width when calculating whether Tx memory 220 is full. For example, occupancy generally may be determined by subtracting the current read address from the current write address. The 1 to 2 ratio will cause Tx read controller 306 to truncate the least significant bit of the write address when read from registers 328 so that the read address and the write address are the same width when determining whether Tx memory 220 is empty, full, and/or whether the trigger level is reached.

A ratio of 2 (write) to 1 (read) will cause Tx write controller 302 to truncate the least significant bit of the read address when determining whether Tx memory 220 is empty. The ratio of 2 to 1 will cause Tx read controller 306 to pad the least significant bit of the write address when determining whether Tx memory 220 is full, empty, and/or whether the trigger level is reached.

It should be appreciated that other ratios cause the padding and/or truncation of additional bits. A ratio of 1 to 4, for example, would cause padding or truncation by 2 least significant bits. A write width value smaller than the read width value in the ratio in Tx system 205 causes Tx write controller 302 to truncate and Tx read controller 306 to pad. A write width value larger than the read width value in the ratio in Tx system 205 causes Tx write controller 302 to pad and Tx read controller 306 to truncate. The number of digits to truncate and/or pad varies with the magnitude of the ratio. Ratios may be 1:1, 1:2, 1:4, 1:8, 1:16, 1:32, 2:1, 4:1, 8:1, 16:1, or 32:1. By controlling the padding and truncation of addresses when making full, empty, and occupancy calculations when determining whether the trigger level is met, different interface widths may be accommodated.

It should be appreciated that the Tx read increment amount and the Tx write increment amount may be the same in the case where memory mapped interface 308 is the same width as streaming interface 310. In that case, no padding and/or truncation of addresses is required between Tx write controller 302 and Tx read controller 306. In cases where the width of memory mapped interface 308 is different from streaming interface 310, the Tx read increment amount will differ from the Tx write increment amount and padding and/or truncation of addresses between Tx write controller 302 and Tx read controller 306 may be required and specified by the ratio.

Figure 4:
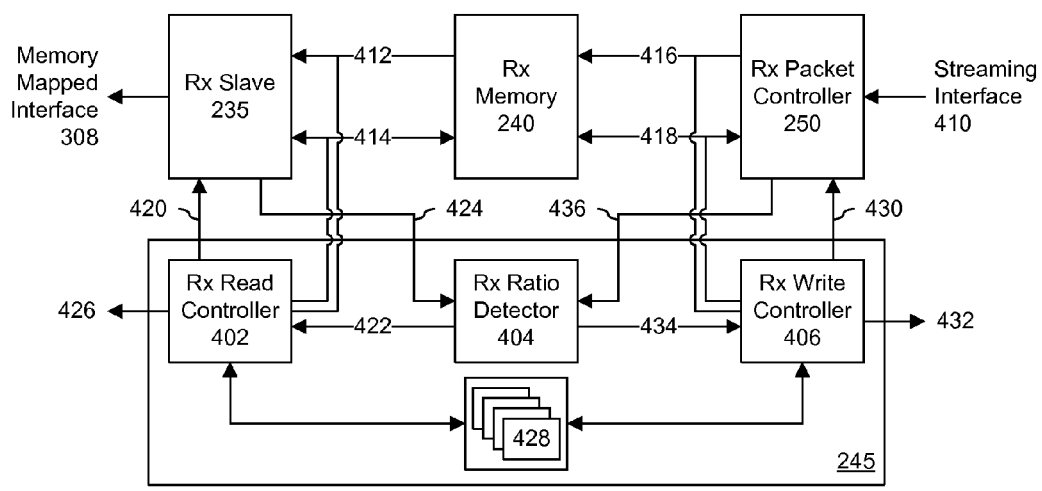
FIG. 4 is a block diagram illustrating an exemplary receive system.

FIG. 4 is a block diagram illustrating an exemplary implementation of Rx system 210. Rx system 210 may be configured to transfer packets from a streaming interface to a memory mapped interface. As pictured, Rx system 210 may include Rx slave 235, Rx memory 240, Rx packet controller 250, and Rx monitor circuit 245. In this example, Rx monitor circuit 245 may include an Rx write controller 406, an Rx ratio detector 404, and an Rx read controller 402.

In the example of FIG. 4, Rx packet controller 250 is coupled to a streaming interface 410, Rx memory 240, and monitor circuit 245. In general, Rx packet controller 250 may receive sub-packets from streaming interface 410 and write the sub-packets to Rx memory 240.

In the example of FIG. 4, Rx packet controller 250 may be coupled to a write port of Rx memory 240 through a plurality of signals. In one aspect, signal 416 may represent data signals. Signal 418 may represent one or more control signals. Accordingly, Rx packet controller 250 may write sub-packets to Rx memory 250 via signal 416. Rx packet controller 250 further may provide control signals to Rx memory 240 via signal 418. For example, Rx packet controller 250 may provide a write enable signal to Rx memory 250 as part of, or within, signal 418.

Rx slave 235 may be coupled to memory mapped interface 308, Rx memory 240, and Rx monitor circuit 245. Rx slave 235 may be coupled to a read port of Rx memory 240 through a plurality of signals. In one aspect, signal 412 may represent data signals. Signal 414 may represent one or more control signals. Accordingly, Rx slave 235 may read the sub-packets from Rx memory 240 via signal 412. Rx slave 235 further may provide control signals to Rx memory 240 via signal 414. For example, Rx slave 235 may provide a write enable signal to Rx memory 240 as part of, or within, signal 414. Rx slave 235 may read sub-packets of one or more packets from Rx memory 240. Rx slave 235 may format the sub-packets for transmission using memory mapped interface 308. For example, Rx slave 235 may be coupled to a read address channel and a read response channel of memory mapped interface 308.

Rx memory 240 may be implemented as a multi-port RAM. Read and write ports of Rx memory 240 may be the same or different widths to correspond to memory mapped interface 308 and streaming interface 410. Further, the read and write ports may be clocked at a same frequency or a different frequency. Rx slave 235 may read sub-packets received from streaming interface 410 from Rx memory 240. In one exemplary implementation, the size of Rx memory 240 may be smaller than the size of the largest packet that passes from streaming interface 410 to memory mapped interface 308 through Rx system 210.

Referring to monitor circuit 245, Rx write controller 406 may be coupled to Rx packet controller 250 through signals 418 and 430, Rx memory 240 through signals 416 and/or 418, and Rx ratio detector 404 through signal 434. In one aspect, Rx write controller 406 may be configured to generate Rx write addresses specifying the locations within Rx memory 240 where sub-packets are written. Rx write addresses generated by Rx write controller 406 may be provided to the write port of Rx memory 240 via signal 418, for example. Sub-packet data provided to Rx memory 240 via signal 416 is written to the Rx write address(es) provided by Rx write controller 406.

In one exemplary implementation, Rx write controller 406 may generate Rx write addresses by incrementing an Rx write address from a prior write operation by an Rx write increment amount. Signal 436 may indicate a width of streaming interface 410. In one particular example, signal 436 may indicate the width of the data channel of streaming interface 410. The width may be specified as a number of bits, a number of bytes, or the like. The Rx write increment amount may be 1 byte, 2 bytes, 3 bytes, 4 bytes, 8 bytes, etc. based upon the width specified by signal 436 in order to provide correct Rx read addressing to Rx memory 240. As pictured, Rx ratio detector 404 may be coupled to Rx packet controller 250 by signal 436.

For example, Rx write controller 406 may receive a write enable signal from Rx packet controller 250 via signal 418. Responsive to receiving the write enable signal, Rx write controller 406 may increment the write address stored therein by the Rx write increment amount specified by signal 434. Rx write controller 406 may provide the newly generated write address to the write port of Rx memory 240 via signal 418. Data stored in Rx memory 240 may be written to the Rx write address provided by Rx write controller 406.

In another aspect, Rx write controller 406 may be coupled to registers 428 within monitor circuit 245. Registers 428 that may be accessed, e.g., read and/or written, by Rx read controller 402 and/or Rx write controller 406. Registers 428, for example, may store values used by monitor circuit 245 to make one or more determinations and exercise control over one or more circuit blocks of Rx system 210. For example, registers 428 may include a register that stores a size of a current packet being received by Rx packet controller 250. The size of the current packet may be determined from the header information in the packet received by Rx write controller 406 and written to registers 428. Registers 428 may also include a register that stores an amount of the current packet received by Rx packet controller 250 at a current moment in time that may be continually updated as determined by Rx write controller 406. In another example, registers 428 may include a register indicating a general status of whether a partial packet is received or an entirety of a packet has been received as determined and updated by Rx write controller 406. In one aspect, registers 428 may be large enough to support packet sizes of up to 2 GB in size.

In another example, Rx write controller 406 may store the current write address provided to Rx memory 240 within registers 428. For example, Rx write controller 406 may write the current write address to registers 428 each time a new write address is provided to Rx memory 240. Similarly, Rx read controller 402 may store the current read address provided to Rx memory 240 within registers 428. For example, Rx read controller 402 may write the current read address to registers 428 each time a new read address is provided to Rx memory 240.

Rx write controller 406 may be configured to determine whether Rx memory 240 is full by comparing the read address and the write address. Rx write controller 406 may determine whether Rx memory 240 is full, empty, and/or the occupancy of Rx memory 240 on a continuous and/or periodic basis.

Rx write controller 406 may indicate to Rx packet controller 250 that Rx memory 240 is full through signal 430. Further, Rx write controller 406 may generate an interrupt signal 432 responsive to determining that Rx memory 240 is full. Responsive to the interrupt, the system processor may discontinue sending data over streaming interface 410 to Rx packet controller 250 and/or implement one or more interrupt handling operations.

Rx read controller 402 may be coupled to Rx slave 235 through signals 414 and 420, Rx memory 240 through signals 412 and/or 414, and Rx ratio detector 404 through signal 422. In one aspect, Rx read controller 402 may be configured to generate Rx read addresses specifying where sub-packets are read from within Rx memory 240. Rx read addresses generated by Rx read controller 402 may be provided to the read port of Rx memory 240 via signal 414, for example. Sub-packet data received from Rx memory 240 via signal 412 may be read from the Rx read address(es) provided by Rx read controller 402.

In one exemplary implementation, Rx read controller 402 may generate Rx read addresses by incrementing an Rx read address from a prior read operation by an Rx read increment amount. As pictured, Rx ratio detector 404 may be coupled to Rx slave 235 by signal 424. Signal 424 may indicate a width of memory mapped interface 308. In one particular example, signal 424 may indicate the width of the read data channel of memory mapped interface 308. The width may be specified as a number of bits, a number of bytes, or the like.

For example, Rx read controller 402 may receive a read enable signal from Rx slave 235 via signal 414. Responsive to receiving the read enable signal, Rx read controller 402 may increment the Rx read address stored therein by the Rx read increment amount specified by signal 422. The Rx read increment amount may be 1 byte, 2 bytes, 3 bytes, 4 bytes, 8 bytes, etc. as determined from the width of memory mapped interface 308 specified by signal 424. Rx read controller 402 may provide the newly generated Rx read address to the read port of Rx memory 240 via signal 414. Data stored in Rx memory 240 may be read from the Rx read address received from Rx read controller 402.

Rx read controller 402 may be coupled to registers 428. As noted, Rx read controller 402 may store the current read address within registers 428. Rx read controller 402 may be configured to determine whether Rx memory 240 is full, empty, and/or the occupancy of Rx memory 240 by comparing the read and the write address. Rx read controller 402 may determine whether Rx memory 240 is full, empty, and/or the occupancy on a continuous and/or periodic basis.

In one example, Rx read controller 402 may indicate to Rx slave 235 when Rx memory 240 is empty through signal 420. Further, Rx read controller 402 may generate an interrupt signal 426 that may be provided to a system processor controlling read transactions over memory mapped interface 308. Responsive to the interrupt, the processor may discontinue reading data over memory mapped interface 308 via Rx slave 235 and/or implement one or more other interrupt handling operations.

In another aspect, registers 428 may include a register that stores a value for a trigger level. The trigger level is an occupancy of Rx memory 240 that, when reached or exceeded, causes Rx read controller 402 to initiate reading of sub-packets by Rx slave 235 from Rx memory 240. As discussed, the capacity of Rx memory 240 may be less than the size of the largest packet to be processed. The trigger level may be set to an amount less than the capacity of Rx memory 240. Referring to the earlier example, Rx memory 240 may be 2 KB in size, while the trigger level may be set to 1.5 KB in size and the largest packet may be 64 KB. System 100 may support packet sizes of up to 2 GB.

For example, Rx read controller 402 may monitor the register indicating the occupancy of Rx memory 240. Responsive to the occupancy of Rx memory 240 being greater than or equal to the trigger level, Rx read controller 402 may instruct Rx slave 235 to begin reading sub-packets via signal 414. Rx slave 235, in response, may generate a read enable signal via signal 414. Rx read controller 402 may generate the necessary read addresses responsive to the read enable signal.

In one example, Rx ratio detector 404 may determine whether the width of memory mapped interface 308 or streaming interface 410 is greater and find a ratio. In cases where the interface widths are different, the ratio indicates that the width of the read and/or write addresses may require adjusting. The ratio, for example, may indicate whether to pad addresses, to truncate addresses, or do neither when determining whether Tx memory 240 is empty, full, and/or whether the trigger level is reached.

For example, consider the case where memory mapped interface 308 is 32 bits and streaming interface 410 is 64 bits. Rx ratio detector 404 may determine that streaming interface 410 is larger and determine that the ratio is 2 (for write) to 1 (for read) in Rx system 210. In this example, Rx slave 235 may view Rx memory 240 as 32 bits wide and 1 K entries deep. Rx packet controller 250 may see Rx memory 240 as 64 bits wide and 512 entries deep.

Rx read controller 402 will use read addresses using bits [0:9] of the available addressing bits (e.g., 15 addressing bits) to read from Rx memory 240. Rx write controller 406 will use write addresses using bits [0:8] of the available addressing bits to write to Rx memory 240. In one aspect, the determined ratio indicates whether to pad and/or truncate the least significant bit of an address passed between Rx read controller 402 and Rx write controller 406. The widths of the address buses for reading and writing may be large enough to support a variety of different widths. When comparing read and/or write address for determining whether Rx memory 240 is full, empty, or whether the trigger level is reached, the addresses must be processed to have the same width.

In this example, the ratio is determined by Rx ratio detector 404 to be 2 (write) to 1 (read). This ratio causes Rx read controller 402 to pad (add) a zero to the least significant bit of write address read from registers 428. The resulting write address may then be compared to the read address for purposes of determining whether Rx memory 240 is full, empty, and/or the trigger level is reached. The ratio 2 to 1 causes Rx write controller 406 to truncate the least significant bit of the read address as read from registers 428. The resulting read address may then be compared to the write address for purposes of determining whether Rx memory 240 is full, empty, and/or the trigger level is reached. By controlling the padding and truncation of addresses, precise full, empty, and trigger conditions may be determined despite having different interface widths.

A write width value smaller than the read width value in the ratio in Rx system 210 causes Rx write controller 406 to pad and Rx read controller 402 to truncate. A write width value larger than the read width value in the ratio in Rx system 210 causes Rx write controller 406 to truncate and Rx read controller 402 to pad. The number of digits to truncate and/or pad varies with the magnitude of the ratio.

It should be appreciated that the Rx read increment amount and the Rx write increment amount may be the same in the case where memory mapped interface 308 is the same width as streaming interface 410. In that case, no padding and/or truncation of addresses is required between Rx read controller 402 and Rx write controller 406. In cases where the width of memory mapped interface 308 is different from streaming interface 410, the Rx read increment amount will differ from the Rx write increment amount and padding and/or truncation of addresses between Rx read controller 402 and Rx write controller 406 may be required and specified by the ratio.

It should be appreciated that the Rx read increment amount and the Rx write increment amount may be the same in the case where memory mapped interface 308 is the same width as streaming interface 410. In cases where the width of memory mapped interface 308 is different from streaming interface 410, the Rx read increment amount will differ from the Rx write increment amount.

Figure 5:
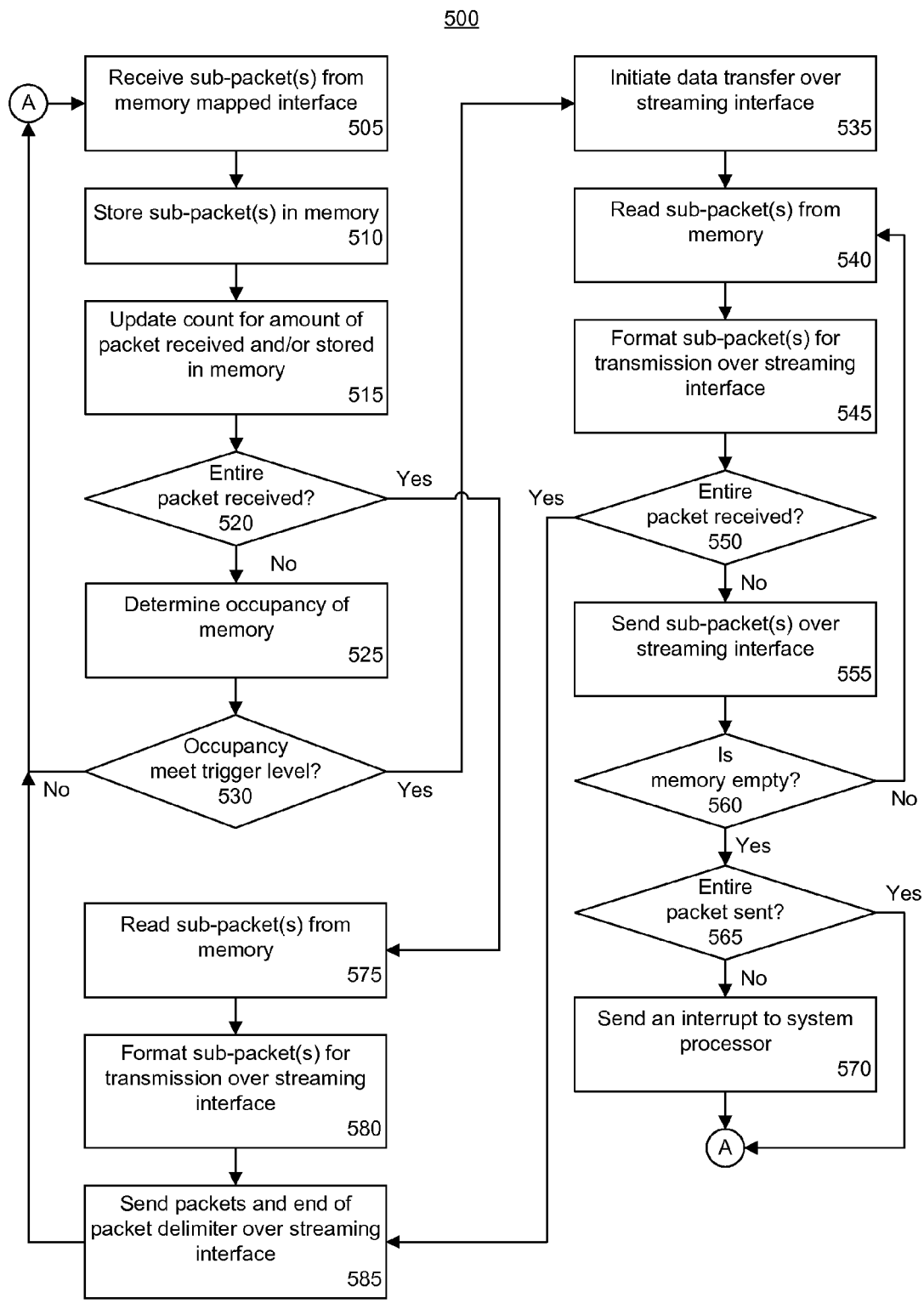
FIG. 5 is a flow chart illustrating an exemplary method of exchanging data between interfaces.
Figures 1, 6:
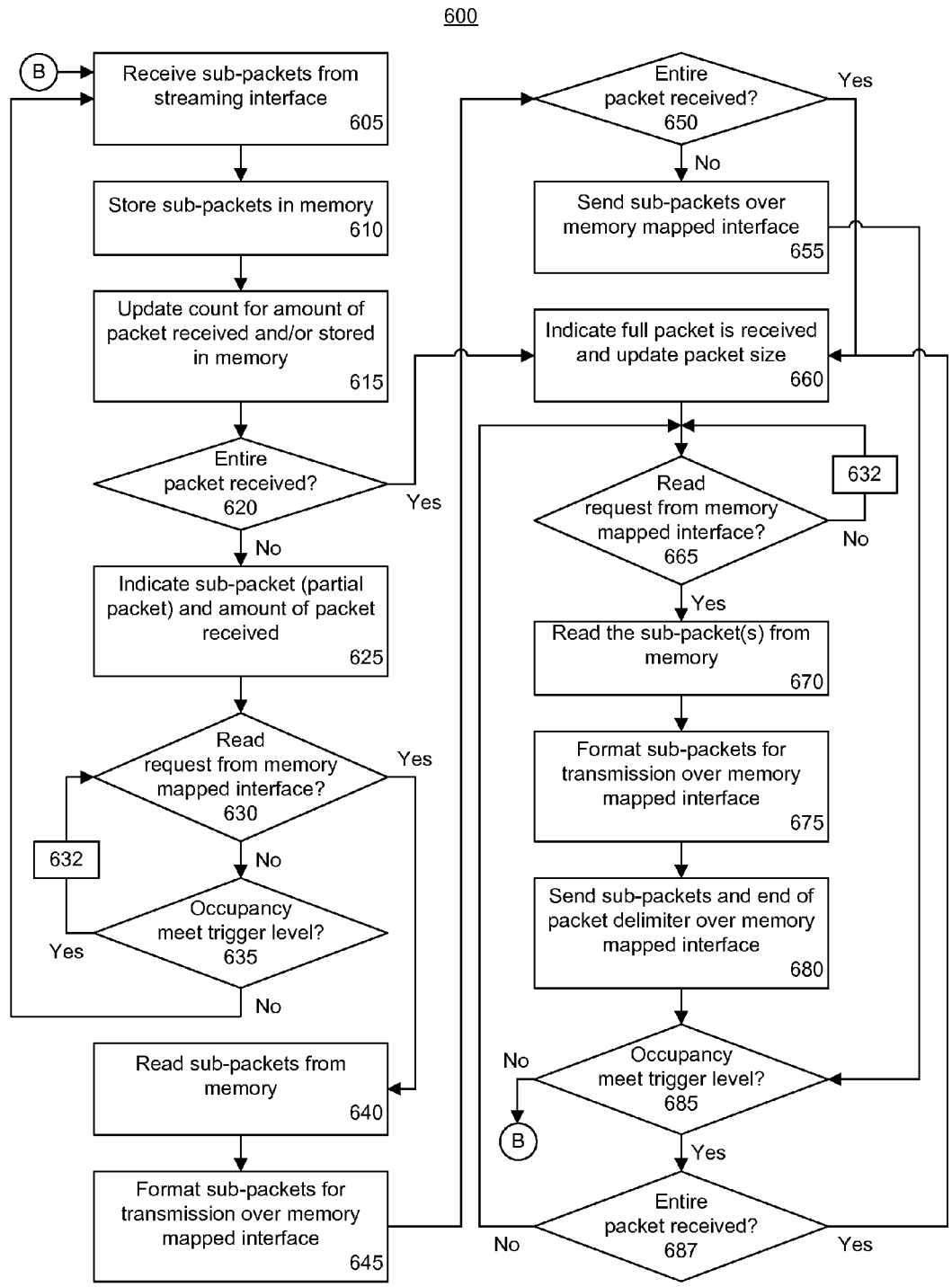
Figures 2, 6:
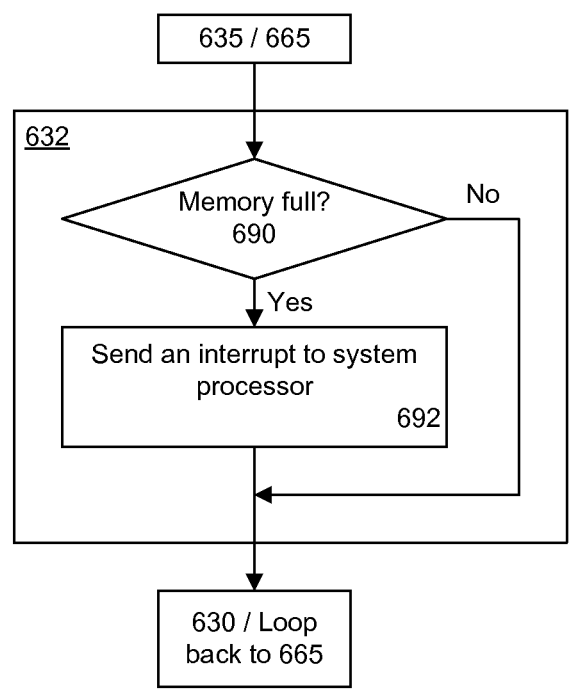

Operation of system 100 is described generally with respect to FIGS. 1-3. Further details regarding operation of system 100 will be described below with reference to the flow chart illustrations of FIGS. 5 and 6. FIGS. 5 and 6 describe additional aspects of system 100. While FIGS. 5 and 6 are illustrated in a sequential flow chart type of format, those skilled in the art will recognize that the various circuit blocks of system 100 described herein may operate concurrently with one another and/or continuously to perform the operations described. The various blocks of FIGS. 5 and 6 are intended to illustrate the various conditions that may occur while appreciating that these operations may occur concurrently and/or overlap in an actual implementation.

For example, sub-packets may be continually received and stored in memory while other circuit blocks perform various operations such as checking the amount of data received, occupancy of the memory, reading sub-packets, formatting sub-packets, and sending sub-packets. In this regard, FIGS. 5 and 6 present an illustration of the various operations of system 100 and is not intended to be limiting of those operations.

FIG. 5 is a flow chart illustrating an exemplary method 500 of exchanging data between interfaces. Method 500 may be performed by a system such as the systems described with reference to FIGS. 1, 2 and/or 3. Method 500 is directed to the transmission of data from a memory mapped interface to a streaming interface. Accordingly, in a more specific example, method 500 may be implemented by Tx system 205.

In block 505, the Tx system may receive one or more sub-packets from the memory mapped interface. For example, Tx slave 215 may receive one or more sub-packets over time. In block 510, the Tx system may store sub-packet(s) within Tx memory 220. For example, Tx slave 215 may store sub-packet(s) received via the memory mapped interface within Tx memory 220.

In one example, for purposes of discussion, a sub-packet on the memory mapped interface side may be the same size as the width of the data write channel of the memory mapped interface. Responsive to receiving each sub-packet from the memory mapped interface, TX slave 215 may generate a write enable signal that may be provided to TX memory 220 and to Tx write controller 302. Responsive to each write enable signal, Tx write controller 302 may generate a Tx write address by incrementing the prior Tx write address by the Tx write increment amount as specified by Tx ratio detector 304. Tx slave 210 may write each sub-packet to Tx memory 220 using the corresponding write address provided to Tx memory 220 from Tx write controller 302. Tx write controller 302 further may update the write address in registers 328. In this example, the size of sub-packet written to Tx memory 220 may not be the same size as the sub-packet read from Tx memory 220.

In block 515, the Tx system may update a count specifying an amount of the packet received and/or stored within the memory thus far. For example, responsive to receiving and storing each sub-packet from the memory mapped interface, Tx write controller 302 may update a count stored and maintained within one of registers 328. The running count may be stored in a register referred to as the "Tx amount of packet received register." Responsive to each sub-packet that is received and stored in the memory, Tx write controller 302 may update the count stored in the Tx amount of packet received register. The count specifies the amount, e.g., the number of bytes, of the current packet being transmitted that has been received thus far.

In one example, a header of the packet, which may be received as one or more sub-packets and stored in Tx memory 220, may specify the size of the packet being transmitted and/or the size of the data payload of the packet being transmitted. Tx write controller 302 may read the packet size from Tx memory 220 and store the packet size in one of registers 328, e.g., within a "Tx packet size register."

It should be appreciated that in another aspect, Tx write controller 302 may monitor whether Tx memory 240 is full. In that case, for example, Tx write controller 302 may generate an interrupt signal to the system processor to discontinue writing of data to the memory mapped interface, at least temporarily.

In block 520, the Tx system may determine whether an entire packet has been received. If so, method 500 may continue to block 575. If not, method 500 may proceed to block 525. For example, Tx read controller 306 may compare the value stored in the Tx amount of packet received register with the value stored in the Tx packet size register. When the value stored in the Tx amount of packet received register is less than the value stored in the Tx size of packet register, method 500 may continue to block 525 from block 520. Responsive to the value in the Tx amount of packet received register being greater than or equal to the value stored in the Tx size of packet register, method 500 may proceed to block 575 from block 520.

Continuing with block 525, the Tx system may determine the occupancy of the memory. For example, Tx read controller 306 may determine the occupancy of transmit memory 220. In one aspect, Tx read controller 306 may read the current read address and the current write address from registers 328, adjust the write address according to the ratio of widths, and calculate occupancy of the memory. In block 530, the Tx system may make a determination as to whether the occupancy meets a trigger level. If so, method 500 may continue to block 535. If not, method 500 may loop back to block 505 to continue receiving sub-packets.

For example, Tx read controller 306 may compare the occupancy of Tx memory 220 with the trigger level. The trigger level also may be stored in one of registers 328. Responsive to determining that the occupancy of Tx memory 220 is less than the trigger level, method 500 may loop back to block 505 to continue receiving further sub-packets of the current packet being transmitted. Responsive to determining that the occupancy of Tx memory 220 is greater than or equal to the trigger level, method 500 may proceed to block 535.

Continuing with block 535, the Tx system may initiate data transfer using the streaming interface. Data transfer may be initiated in block 535 responsive to the occupancy of Tx memory 220 meeting or exceeding the trigger level. In this regard, portions of the current packet may be transmitted over the streaming interface without first receiving and/or storing the entirety of the packet in the memory.

In one aspect, initiating the data transfer may include Tx read controller 306 comparing the occupancy of Tx memory 220 with the trigger level. Responsive to determining that the occupancy of Tx memory 220 exceeds the trigger level, Tx read controller 306 may provide a trigger signal to Tx packet controller 230. Responsive to the trigger signal, Tx packet controller 230 may begin sending data over the streaming interface.

In block 540, the Tx system may read one or more sub-packets from the memory. Tx packet controller 230, for example, may generate Tx read enable signals to Tx memory 220. Tx read controller 306 may also receive the read enable signals. Responsive to each read enable signal, Tx read controller 306 may generate a Tx read address by incrementing the prior Tx read address by the Tx read increment amount as specified by Tx ratio detector 304. Tx packet controller 230 may read each sub-packet from Tx memory 220 using the corresponding read address provided to Tx memory 220 from Tx read controller 306. Tx read controller 306 further may store the current read address within registers 328.

In block 545, the Tx system may format the sub-packet(s) for transmission using the streaming interface. Tx packet controller 230, for example, having read sub-packet(s) from Tx memory 220, may format the sub-packet(s) for transmission over the streaming interface. Tx packet controller 230 may format the sub-packet(s) as a streaming interface transaction.

In block 550, the Tx system may determine whether the entire packet has been received. If so, method 500 may proceed to block 585. If not, method 500 may continue to block 555. In one aspect, block 550 may be performed since Tx slave 215 may continue writing data to Tx memory 220 while Tx packet controller reads data from Tx memory 220. As an illustrative example, consider the case where the packet size is 61 KB. Tx packet controller 230 may be sending a chunk of data with a size of 2 KB concurrently while the last 1 KB of the 61 KB packet is being written to Tx memory 220. In that case, block 550 may detect the end of packet condition.

In one aspect, Tx write controller 302 may compare the value stored in the Tx amount of packet received register with the value stored in Tx packet size register to determine whether the entire packet has been received. Tx write controller 302 may determine that the entire packet has been received responsive to determining that the value in the Tx amount of packet received register is equal to the value stored in the Tx packet size register. In response to determining that the entire packet is received, Tx write controller 302 may update a packet status register of registers 328. Rx read controller 306 may detect the change to the packet status register, thereby determining that the entire packet is received.

In block 555, the Tx system may send the sub-packet(s), as formatted in block 545, over the streaming interface. Tx packet controller 230, for example, may send the sub-packets formatted in block 545 over the streaming interface as streaming data. Further, the Tx amount of packet received register and the Tx packet size register may be initialized. In one aspect, the Tx packet size register may be updated to indicate the size of the next packet being sent.

In block 560, the Tx system may determine whether the memory is empty. For example, Tx read controller 306 may determine whether Tx memory 220 is empty by comparing the read address and the write address after making any adjustment to the width of the write address according to the ratio. If Tx memory 220 is empty, method 500 may continue to block 565. If not, method 500 may loop back to block 540 to process further sub-packet(s) from the memory.

In block 565, the Tx system may determine whether the entire packet has been received. For example, Tx write controller 302 may determine whether the entire packet has been received as previously described. If the entire packet has been received, method 500 may continue to block 505. If the entire packet has not been received, method 500 may proceed to block 570.

In block 570, the system may send an interrupt to the system processor. In block 570, for example, Tx read controller 306, may determine that the entire packet has not been received based upon the value stored in the packet status register and that Tx memory 220 is empty. In that case, Tx read controller 306 may send an interrupt signal to the system processor. The system processor, for example, may be the processor responsible for sending data that arrives at Tx slave 215. The interrupt indicates that a data underrun has occurred.

As noted, in the case where the entire packet has been received as determined in block 520, method 500 continues to block 575. In block 575, the Tx system may read sub-packet(s) from memory. Tx packet controller 230, for example, may read the sub-packet(s) from Tx memory 220 as described. In block 580, the Tx system may format the sub-packet(s) for transmission over the streaming interface. In block 585, the Tx system may send the sub-packets and an end of packet identifier, e.g., a delimiter, over the streaming interface as streaming data. The end of packet identifier indicates the end of the packet within the data being sent using the streaming interface.

In one aspect, the memory mapped interface and the streaming interface may be different widths. In this regard, data may be written by Tx slave 215 to Tx memory 220 in a first bit width each clock cycle while Tx packet controller 230 reads data from Tx memory 220 in a second, different bit width each clock cycle. The Tx write address increment value and the Tx read address increment values, which are not equal in the case where the memory mapped interface width is different than the streaming interface width, account for writing and reading different amounts of data to and from Tx memory 220. It should be appreciated that unused bits of the addresses may be truncated and/or padded with zeroes as may be required depending upon the ratio determined by the Tx ratio detector 304.

Supporting different interface widths may be advantageous in applications where one interface may operate at a faster clock rate than the other interface. For example, the memory mapped interface may have a width of 32 bits and operate at a clock frequency of 200 MHz. The streaming interface may operate at a clock frequency of 50 MHz, but with a width of 128 bits. The addressing described adjusts for the size of data being written to Tx memory 220 and read from Tx memory 220.

FIGS. 6-1 and 6-2, taken collectively, are a flow chart illustrating an exemplary method 600 of exchanging data between interfaces. Method 600 may be performed by a system such as the systems described with reference to FIGS. 1, 2, and/or 4. Method 600 is directed to the transmission of data from a streaming interface to a memory mapped interface. Accordingly, in a more specific example, method 600 may be implemented by an Rx system 210.

In block 605, the Rx system may receive one or more sub-packets from the streaming interface. For example, Rx packet controller 250 may receive one or more sub-packets over the streaming interface as streaming data. In block 610, the Rx system may store the received sub-packets within the memory. Rx packet controller 250, for example, may store the received sub-packets within Rx memory 240.

In one example, a sub-packet on the streaming interface side may be the same size as the width of the streaming interface for purposes of illustration. Responsive to receiving each sub-packet from the streaming interface, Rx packet controller 250 may generate a write enable signal that may be provided to Rx memory 240 and to Rx write controller 406. Responsive to each write enable signal, Rx write controller 406 may generate a write address by incrementing the prior write address by the Rx write increment amount as specified by Rx ratio detector 404. Rx packet controller 250 may write each sub-packet to Rx memory 240 using the corresponding write address provided to Rx memory 240 from Rx write controller 406. Rx write controller 406 further may store the current write address in registers 428. In this example, the size of sub-packet read out of Rx memory 240 may differ from the size of sub-packet written to Rx memory 240.

In block 615, the Rx system may update a count of the amount of the packet received thus far over the streaming interface and/or stored in the memory. For example, Rx write controller 402 may update a count indicating the amount of the packet currently being transmitted that has been stored in Rx memory 240. The count may be stored as a value within an Rx amount of packet received register of registers 428.

In block 620, the Rx system may determine whether the entire packet is received. If the entire packet is received, method 600 may proceed to block 660. If not, method 600 may proceed to block 625. For example, Rx write controller 406 may determine packet size and store the packet size in an Rx packet size register of registers 428. In one example, Rx write controller 406 may determine the size of the packet from a header portion of the packet received as one or more sub-packets stored in Rx memory 240. Rx write controller 406, for example, may compare the value stored in the Rx packet size register with the value stored in the Rx amount of packet received register. Responsive to determining that the value stored in the Rx amount of packet received register is greater than or equal to the value stored in the Rx packet size register, the Rx system determines that the entire packet is received.

In block 625, since the entire packet is not yet received, the Rx system may indicate that a sub-packet, e.g., a partial packet, is received. Rx write address generator 406, for example, may update a packet status register of registers 428 indicating that the entire packet is not yet received. Rx read controller 402 may monitor the packet status register.

In block 630, the Rx system may determine whether a read request is received from the memory mapped interface. If so, method 600 continues to block 640. If not, method 600 proceeds to block 635. In one example, Rx slave 235 may generate a read enable signal responsive to a read request. In that case, Rx read controller 402 may determine that a read request is received responsive to detecting the read enable from Rx slave 235.

In block 635, the Rx system may determine whether the occupancy of the memory meets a trigger level. It should be appreciated that the trigger level used in the Rx system may be the same as the trigger level in the Tx system. In another aspect, however, the trigger level in the Rx system may be different from the trigger level in the Tx system. If so, method 600 may loop back to block 630 through block 632 to continue checking for a read request from the memory mapped interface. If not, method 600 may loop back to block 605 to continue receiving further sub-packets. For example, Rx read controller 402 may compare the occupancy of Rx memory 240 with the trigger level. As discussed, occupancy generally may be determined by subtracting the read address from the write address after making any necessary width adjustments to the read address and/or the write address based on the ratio. Responsive to determining that the occupancy is greater than or equal to the trigger level, method 600 may continue to block 632 and on to block 630. Responsive to determining that the occupancy is less than the trigger level, method 600 may loop back to block 605.

In FIG. 6-2, block 632 is expanded. As pictured, the Rx system may determine whether the memory is full in block 690. If not, method 600 may proceed to block 630. If so, method 600 may proceed to block 692 and then proceed to block 630. In block 692, the Rx system may send an interrupt to the system processor. Rx read controller 402 may send an interrupt to the system processor. The system processor, for example, may at least temporarily discontinue the sending of data over the streaming interface and/or initiate a read request over the memory mapped interface.

Continuing with block 640 in FIG. 6-1, the Rx system may read sub-packets from memory. For example, Rx slave 235 may read one or more sub-packets from Rx memory 240. Rx slave 235 may generate an Rx read enable signal to Rx memory 240. Rx read controller 402 may also receive the Rx read enable signals. Responsive to each Rx read enable signal, Rx read controller 402 may generate an Rx read address by incrementing the prior Rx read address by the Rx read increment amount as specified by Rx ratio detector 404. Rx read controller 402 further may store the current read address within registers 428. Rx slave 235 may read data from Rx memory 240 using the corresponding Rx read address provided to Rx memory 240 from Rx read controller 402.

In block 645, the Rx system may format the sub-packet(s) read from the memory for transmission over the memory mapped interface. For example, Rx slave 235 may format the sub-packet(s) read from Rx memory 240 for transmission over the memory mapped interface. In illustration, Rx slave 235 may read Rx memory 240 and send the data over the memory mapped interface while also performing appropriate handshake signaling and read status signaling. In the case where the width of the memory mapped interface is different than the width of the streaming interface, Rx slave 235 need only send required data.

In block 650, the Rx system may determine whether the entire packet is received. If so, method 600 may continue to block 660. If not, method 600 may proceed to block 655. In one aspect, Rx write controller 406 may determine whether the entire packet is received according to whether the amount of the packet received meets or exceeds the size of the packet as discussed with reference to the Tx system.

In block 655, the Rx system may send the sub-packets read from the memory over the memory mapped interface. For example, Rx slave 235 may send the sub-packets. After block 655, method 600 may continue to block 685.

Continuing with block 660, the Rx system, responsive to determining that the entire packet is received, may indicate that a full packet, e.g., the entire packet, is received. In one example, Rx write controller 406 may update a packet status register within registers 428 indicating that the entire packet is received. Rx read controller 402 may detect the change in the packet status register indicating that the entire packet is received.

In block 665, the Rx system may determine whether a read request is received from the memory mapped interface. If so, method 600 may continue to block 670. If not, method 600 may loop back through block 632 to continue checking for a read request. For example, Rx read controller 402 may determine whether a read request has been received as described with reference to block 630.

In looping back to continue awaiting a read request, block 632 may be performed. As described, the Rx system may determine whether the memory is full in block 690. If not, method 600 may proceed to block 665. If so, method 600 may proceed to block 692. In block 692, the Rx system may send an interrupt to the system processor. For example, Rx read controller 402 and/or Rx write controller 406 may determine whether Rx memory 240 is full by comparing the read and write addresses subsequent to any necessary width adjustment. Rx read controller 402 and/or Rx write controller 406 may send an interrupt to the system processor. The system processor, for example, may at least temporarily discontinue the sending of data over the streaming interface and/or initiate a read request over the memory mapped interface. After block 692, method 600 may continue looping back to block 665.

Proceeding with block 670, the Rx system may read the remainder of the sub-packets of the packet from the memory. For example, Rx slave 235 may read the remainder of the packet stored in Rx memory 240.

In block 675, the sub-packets may be formatted for transmission over the memory mapped interface as previously described. In one aspect, block 675 may be implemented responsive to either one of two different scenarios. In a first scenario, block 675 may be performed responsive to determining that the entire packet is received and that a read request has been received. In a second scenario, block 675 may be performed responsive to determining that the trigger level is met and that a read request has been received.

In block 680, the Rx system may send the formatted sub-packets over the memory mapped interface with an end of packet identifier. Rx slave 235, for example, may send the sub-packets and the end of packet identifier over the memory mapped interface. Rx slave 235 may send the end of packet identifier responsive to a signal from Rx read controller 402 detecting that the entire packet is received from the status register.

In one aspect, Rx slave 235, while sending the last beat, may assert an end of packet signal such as RLAST. The end of packet signal, e.g., RLAST, may need to be asserted at the precise data beat. A "data beat" is an individual data transfer within a burst transfer. As noted, the memory mapped interface may be an AXI interface. A burst refers to a transaction where multiple data items are transferred based upon a single address. Each data item of the burst may be referred to as a beat.

In block 685, the Rx system may determine whether the occupancy meets the trigger level. If so, method 600 may continue to block 687. If not, method 600 may loop back to block 605 to continue processing further data received over the streaming interface.

In block 687, the Rx system may determine whether the entire packet was received as previously described. If not, method 600 may loop back to block 665 to check for a read request from the memory mapped interface. If so, method 600 may loop back to block 660 to indicate a full packet is received. Determining whether the entire packet is received addresses one exemplary scenario where the trigger level and the end of packet may be encountered concurrently. Consider the case where the packet size is 50 KB and the trigger level is 1 KB or 2 KB. In that case, the end of packet may coincide with reaching the trigger level. In that case, the full packet received indication is set in the status register to initiate the sending of the end of packet indicator.

In one aspect, the memory mapped interface and the streaming interface may be different widths. In this regard, data in a first bit width may be received over the streaming interface by Rx packet controller 250 and written to Rx memory 240 each clock cycle. Data may be read from Rx memory 240 in a second, different bit width that may be used to transmit data over the memory mapped interface each clock cycle. In that case, the Rx read increment value and the Rx write increment values may differ. It should be appreciated that the Rx read increment value and the Rx write increment value may be the same in the case where the bit width of the memory mapped interface matches, e.g., is the same as, the bit width of the streaming interface.

As noted, the various systems described herein may be implemented as electronic circuitry such as within an IC. ICs may be implemented to perform a variety of functions. Some ICs can be programmed to perform specified functions. One example of an IC that can be programmed is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs may also be implemented in other ways, e.g., using fuse or antifuse technology. The phrase "programmable IC" may include, but is not limited to, these devices and further may encompass devices that are only partially programmable. For example, one type of programmable IC includes a combination of hard-coded transistor logic and a programmable switch fabric that programmably interconnects the hard-coded transistor logic.

Figure 7:
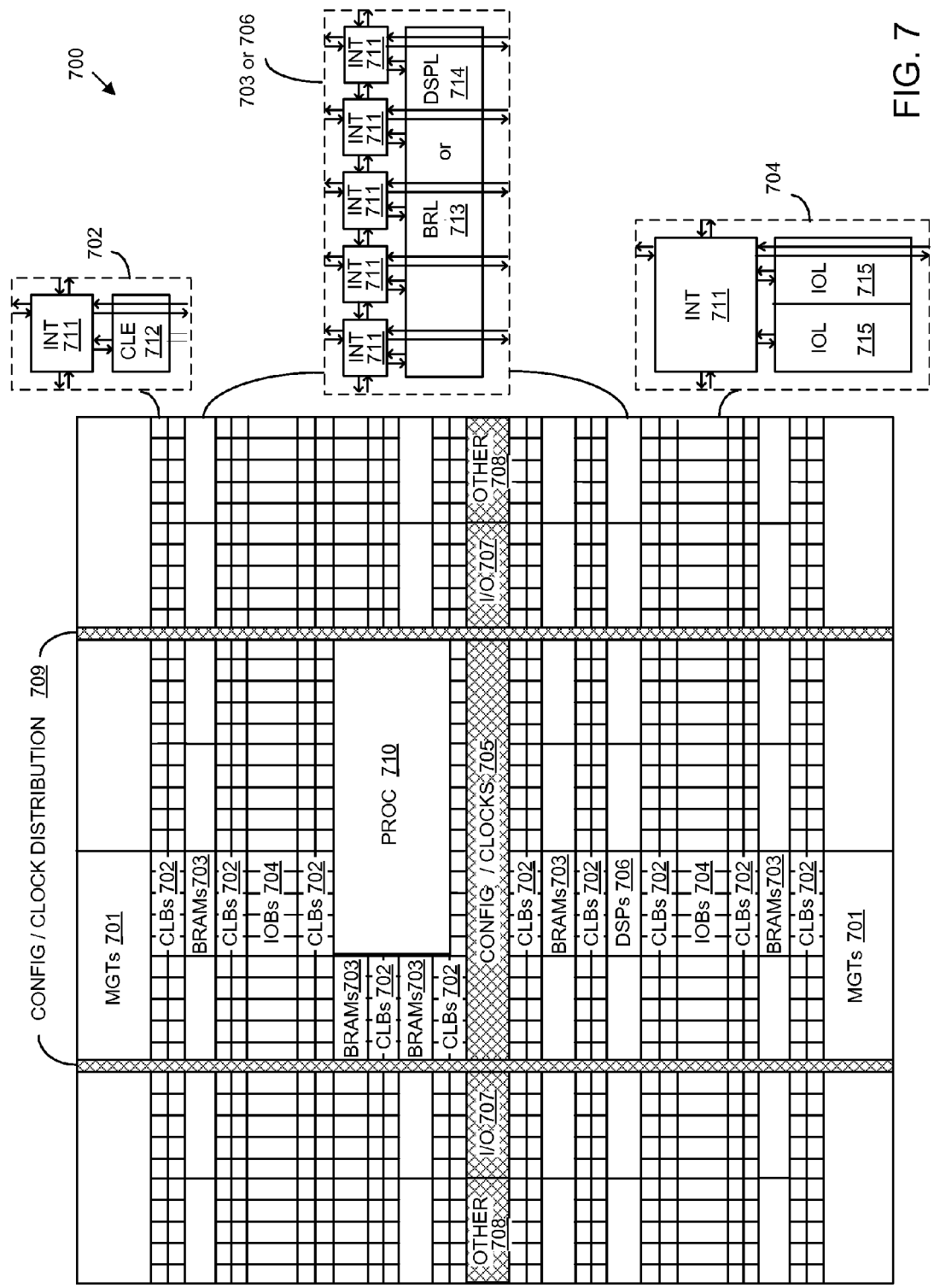
FIG. 7 is a block diagram illustrating an exemplary architecture for an integrated circuit (IC).

FIG. 7 is a block diagram illustrating an exemplary architecture 700 for an IC. In one aspect, architecture 700 may be implemented within a programmable IC. For example, architecture 700 may be used to implement an FPGA. Architecture 700 may also be representative of an SOC type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 700 includes several different types of programmable circuit, e.g., logic, blocks. For example, architecture 700 may include a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized I/O blocks 707 (e.g., configuration ports and clock ports), and other programmable logic 708 such as digital clock managers, analog-to-digital converters, system monitoring logic, and so forth.

In some ICs, each programmable tile includes a programmable interconnect element (INT) 711 having standardized connections to and from a corresponding INT 711 in each adjacent tile. Therefore, INTs 711, taken together, implement the programmable interconnect structure for the illustrated IC. Each INT 711 also includes the connections to and from the programmable logic element within the same tile, as shown by the examples included at the top of FIG. 7.

For example, a CLB 702 may include a configurable logic element (CLE) 712 that may be programmed to implement user logic plus a single INT 711. A BRAM 703 may include a BRAM logic element (BRL) 713 in addition to one or more INTs 711. Typically, the number of INTs 711 included in a tile depends on the height of the tile. As pictured, a BRAM tile has the same height as five CLBs, but other numbers (e.g., four) also may be used. A DSP tile 706 may include a DSP logic element (DSPL) 714 in addition to an appropriate number of INTs 711. An 10B 704 may include, for example, two instances of an I/O logic element (IOL) 715 in addition to one instance of an INT 711. The actual I/O pads connected to IOL 715 may not be confined to the area of IOL 715.

In the example pictured in FIG. 7, a columnar area near the center of the die, e.g., formed of regions 705, 707, and 708, may be used for configuration, clock, and other control logic. Horizontal areas 709 extending from this column may be used to distribute the clocks and configuration signals across the breadth of the programmable IC.

Some ICs utilizing the architecture illustrated in FIG. 7 include additional logic blocks that disrupt the regular columnar structure making up a large part of the IC. The additional logic blocks may be programmable blocks and/or dedicated circuitry. For example, a processor block depicted as PROC 710 spans several columns of CLBs and BRAMs.

In one aspect, PROC 710 may be implemented as dedicated circuitry, e.g., as a hardwired processor, that is fabricated as part of the die that implements the programmable circuitry of the IC. PROC 710 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 710 may be omitted from architecture 700 and replaced with one or more of the other varieties of the programmable blocks described. Further, such blocks may be utilized to form a "soft processor" in that the various blocks of programmable circuitry may be used to form a processor that can execute program code as is the case with PROC 710.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 7 that are external to PROC 710 such as CLBs 702 and BRAMs 703 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 710.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 710 or a soft processor. In some cases, architecture 700 includes a dedicated configuration processor that loads the configuration bitstream to the appropriate configuration memory and/or processor memory. The dedicated configuration processor does not execute user-specified program code. In other cases, architecture 700 may utilize PROC 710 to receive the configuration bitstream, load the configuration bitstream into appropriate configuration memory, and/or extract program code for execution.

FIG. 7 is intended to illustrate an exemplary architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 7 are purely exemplary. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 710 within the IC are for purposes of illustration only and are not intended as limitations.

A system as described with reference to FIGS. 1, 2, 3, and/or 4 may be implemented using architecture 700. For example, each of the various circuit blocks described in FIGS. 1, 2, 3 and/or 4 may be implemented using one or more of the circuit blocks of architecture 700 through the loading of configuration data. The Tx and Rx memories, for example, may be implemented using BRAMs, where the widths of the various ports and the clock frequencies may be specified through configuration data for a circuit design.

The system processor to which interrupts may be directed may be PROC 710. In another aspect, one or more of the circuit blocks illustrated in FIGS. 1, 2, 3, and/or 4 may be implemented as hardwired circuit blocks within architecture 700 or an architecture similar to that of FIG. 7. In any case, particular aspects of the system may be specified in the configuration data such as the width of each interface, clock rates for each interface, or the like.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "plurality" means two or more than two.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), an FPGA, a programmable logic array (PLA), an application specific integrated circuit (ASIC), and a controller.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

From time-to-time, the term "signal" may be used within this disclosure interchangeably to describe physical structures such as terminals, pins, signal lines, wires, and the corresponding signals propagated through the physical structures. The term "signal" may represent one or more signals such as the conveyance of a single bit through a single wire or the conveyance of multiple parallel bits through multiple parallel wires. Further, each signal may represent bi-directional communication between two, or more, components connected by the signal.

The terms first, second, etc. may be used herein to describe various elements. These elements should not be limited by these terms, as these terms are only used to distinguish one element from another unless stated otherwise or the context clearly indicates otherwise.

The flowchart and block diagrams in the Figures illustrate the architecture, functionality, and operation of possible implementations of systems and methods according to various aspects of the inventive arrangements disclosed herein. In one aspect, the blocks in the flow chart illustrations may be performed in the order indicated. In other aspects, the blocks may be performed in an order that is different, or that varies, from the numerals in the blocks and/or the arrows coupling the blocks. For example, two or more blocks shown in succession may be executed substantially concurrently. In other cases, two or more blocks may sometimes be executed in the reverse order, depending upon the functionality involved. In still other cases, one or more blocks may be performed in varying order with the results being stored and utilized in other blocks that do not immediately follow.

The corresponding structures, materials, acts, and equivalents of all means or step plus function elements in the claims below are intended to include any structure, material, or act for performing the function in combination with other claimed elements as specifically claimed.

A method may include receiving sub-packets of a packet from a first interface and storing the sub-packets within a memory at addresses determined according to a width of the first interface. The method may include determining occupancy of the memory as the sub-packets are stored using a ratio of the width of the first interface and a width of the second interface. The method also may include, responsive to determining that the occupancy of the memory meets a trigger level, reading the sub-packets from the memory at addresses determined according to the width of the second interface and sending the sub-packets using the second interface.

The method may include incrementing a write address provided to the memory to write, e.g., store, sub-packets by an amount determined according to a width of the first interface during operation.

The method also may include incrementing a read address provided to the memory to read sub-packets by an amount determined according to a width of the second interface during operation.

The width of the first interface may be different from the width of the second interface.

In one aspect, the first interface may be a memory mapped interface while the second interface may be a streaming interface. In another aspect, the first interface may be a streaming interface while the second interface may be a memory mapped interface.

The method may include determining an amount of the data packet that is received and stored in the memory over time and, responsive to determining that an entirety of the data packet is received, sending an end of data packet identifier using the second interface.

The trigger level may specify an amount of data that is smaller in size than a capacity of the memory. Further, the memory may have a capacity less than a size of the data packet.

Sending the sub-packets stored in the memory using the second interface may include reading the sub-packets from the memory and formatting the sub-packets for transmission using the second interface.

Determining occupancy of the memory may include adjusting a width of at least one of an address used to read the memory or an address used to write the memory according to the ratio.

Sending the sub-packets stored in the memory using the second interface may occur concurrently with receiving a further sub-packet of the data packet using the first interface.

A system may include a memory having a capacity less than a size of a packet, a memory mapped slave configured to receive sub-packets of the packet over a memory mapped interface and store the sub-packets to the memory, and a packet controller configured to read the sub-packets from the memory responsive to a trigger signal and send the sub-packets over a streaming interface. The system may include a monitor circuit coupled to the memory. The monitor circuit may be configured to generate a trigger signal responsive to determining that an occupancy of the memory meets a trigger level less than the capacity of the memory. The monitor circuit further may be configured to generate write addresses, according to a width of the memory mapped interface, provided to the memory mapped slave for writing the sub-packets to the memory, and generate read addresses, according to a width of the streaming interface, provided to the packet controller for reading the sub-packets from the memory.

The streaming interface and the memory mapped interface may be different widths.

The monitor circuit may include a ratio detector. The ratio detector may be configured to determine the width of the memory mapped interface and generate a write increment signal specifying a write increment amount. The ratio detector may be further configured to determine the width of the streaming interface and generate a read increment signal specifying a read increment amount.

The monitor circuit may also include a write controller configured to generate the write addresses by incrementing prior write addresses by the write increment amount and a read controller configured to generate the read addresses by incrementing prior read addresses by the read increment amount.

In one aspect, the write controller, responsive to receiving a write enable signal from the memory mapped slave, may be configured to generate a new write address by incrementing a prior write address by the write increment amount and provide the new write address to a write port of the memory. The read controller, responsive to receiving a read enable signal from the packet controller, may be configured to generate a new read address by incrementing a prior read address by the read increment amount and provide the new read address to a read port of the memory.

The ratio detector may be configured to determine a ratio of a width of the memory mapped interface to a width of the streaming interface. The write controller may be configured to adjust a width of a read address according to the ratio.

In another aspect, the ratio detector may be further configured to determine a ratio of a width of the memory mapped interface to a width of the streaming interface. The read controller may be configured to adjust a width of a write address according to the ratio.

A system may include a memory having a capacity less than a size of a packet, a packet controller configured to receive sub-packets of the packet over a streaming interface and write the sub-packets to the memory, and a memory mapped slave configured to read the sub-packets from the memory responsive to a trigger signal and send the sub-packets over a memory mapped interface. The system also may include a monitor circuit coupled to the memory. The monitor circuit may be configured to generate a trigger signal responsive to determining that an occupancy of the memory meets a trigger level less than a size of the packet. The monitor circuit further may be configured to generate write addresses, according to a width of the streaming interface, provided to the packet controller for writing the sub-packets to the memory and generate read addresses, according to a width of the memory mapped interface, provided to the memory mapped slave for reading the sub-packets from the memory.

The streaming interface and the memory mapped interface may be different widths.

The monitor circuit may include a ratio detector. The ratio detector may be configured to determine the width of the memory mapped interface and generate a read increment signal specifying a read increment amount. The ratio detector also may be configured to determine the width of the streaming interface and generate a write increment signal specifying a write increment amount.

The monitor circuit also may include a write controller. Responsive to receiving a write enable signal from the packet controller, the write controller may be configured to generate a new write address by incrementing a prior write address by the write increment amount and provide the new write address to a write port of the memory. The monitor circuit further may include a read controller. The read controller, responsive to receiving a read enable signal from the memory mapped slave, may be configured to generate a new read address by incrementing a prior read address by the read increment amount and provide the new read address to a read port of the memory.

The features described within this disclosure may be embodied in other forms without departing from the spirit or essential attributes thereof. Accordingly, reference should be made to the following claims, rather than to the foregoing disclosure, as indicating the scope of such features and implementations.

What is claimed is:

1. A method of data exchange using circuitry, comprising:
   receiving sub-packets of a packet from a first interface;
   storing the sub-packets within a memory at addresses determined according to a width of the first interface;
   determining occupancy of the memory as the sub-packets are stored using a ratio of the width of the first interface and a width of the second interface, wherein the ratio is calculated using a monitor circuit during operation of the circuitry;

storing the sub-packets within the memory without sending the sub-packets to the second interface while the occupancy of the memory is below a trigger level; and
responsive to determining that the occupancy of the memory meets the trigger level, reading the sub-packets from the memory at addresses determined according to the width of the second interface and sending the sub-packets using the second interface.

2. The method of claim 1, further comprising:
incrementing a write address provided to the memory to write sub-packets by an amount determined according to a width of the first interface during operation.

3. The method of claim 1, further comprising:
incrementing a read address provided to the memory to read sub-packets by an amount determined according to a width of the second interface during operation.

4. The method of claim 1, wherein the width of the first interface is different from the width of the second interface.

5. The method of claim 1, wherein:
the first interface is a memory mapped interface; and
the second interface is a streaming interface.

6. The method of claim 1, wherein:
the first interface is a streaming interface; and
the second interface is a memory mapped interface.

7. The method of claim 1, further comprising:
determining an amount of a data packet that is received and stored in the memory over time; and
responsive to determining that an entirety of the data packet is received, sending an end of data packet identifier using the second interface.

8. The method of claim 1, wherein:
the trigger level specifies an amount of data that is smaller in size than a capacity of the memory; and
the memory has a capacity less than a size of a data packet.

9. The method of claim 1, wherein sending the sub-packets stored in the memory using the second interface comprises:
reading the sub-packets from the memory; and
formatting the sub-packets for transmission using the second interface.

10. The method of claim 1, wherein determining occupancy of the memory further comprises:
adjusting a width of at least one of an address used to read the memory or an address used to write the memory according to the ratio;
wherein the ratio is determined during operation based upon a first signal received by the monitor circuit specifying a width of a data channel coupled to the first interface and a second signal received by the monitor circuit specifying a width of the second interface.

11. A system, comprising:
a memory having a capacity less than a size of a packet;
a memory mapped slave configured to receive sub-packets of the packet over a memory mapped interface and write the sub-packets in the memory;
a packet controller configured to read the sub-packets from the memory responsive to a trigger signal and send the sub-packets over a streaming interface;
a monitor circuit coupled to the memory and configured to:
calculate, during operation of the circuitry, a ratio of widths of the streaming interface and the memory mapped interface;
determine an occupancy of the memory using the ratio;
generate a trigger signal responsive to determining that the occupancy of the memory meets a trigger level less than the capacity of the memory, wherein the sub-packets are stored in the memory without sending the sub-packets to the streaming interface while the occupancy of the memory is below the trigger level;
generate write addresses, according to the width of the memory mapped interface, provided to the memory mapped slave for writing the sub-packets to the memory; and
generate read addresses, according to the width of the streaming interface, provided to the packet controller for reading the sub-packets from the memory.

12. The system of claim 11, wherein the streaming interface and the memory mapped interface are different widths.

13. The system of claim 11, wherein the monitor circuit comprises:
a ratio detector configured to:
receive a first signal specifying the width of the memory mapped interface, receive a second signal specifying the width of the streaming interface, and calculate the ratio of the widths during operation of the system;
adjust a width of at least one of an address used to read the memory or an address used to write the memory based upon the ratio.

14. The system of claim 13, wherein the ratio detector is further configured to generate a write increment signal specifying a write increment amount and generate a read increment signal specifying a read increment amount, wherein the monitor circuit further comprises:
a write controller, responsive to receiving a write enable signal from the memory mapped slave, configured to generate a new write address by incrementing a prior write address by the write increment amount and provide the new write address to a write port of the memory; and
a read controller, responsive to receiving a read enable signal from the packet controller, configured to generate a new read address by incrementing a prior read address by the read increment amount and provide the new read address to a read port of the memory.

15. A system, comprising:
a memory having a capacity less than a size of a packet;
a packet controller configured to receive sub-packets of the packet over a streaming interface and write the sub-packets to the memory;
a memory mapped slave configured to read the sub-packets from the memory responsive to a trigger signal and send the sub-packets over a memory mapped interface;
a monitor circuit coupled to the memory and configured to:
calculate, during operation of the circuitry, a ratio of widths of the streaming interface and the memory mapped interface;
determine an occupancy of the memory using the ratio;
generate a trigger signal responsive to determining that an occupancy of the memory meets a trigger level less than a size of the packet, wherein the sub-packets are stored in the memory without sending the sub-packets to the memory mapped interface while the occupancy of the memory is below the trigger level;
generate write addresses, according to the width of the streaming interface, provided to the packet controller for writing the sub-packets to the memory; and generate read addresses, according to the width of the memory mapped interface, provided to the memory mapped slave for reading the sub-packets from the memory.

16. The system of claim 15, wherein the streaming interface and the memory mapped interface are different widths.

17. The system of claim 15, wherein the monitor circuit comprises:
 a ratio detector configured to
 receive a first signal specifying the width of the memory mapped interface, receive a second signal specifying the width of the streaming interface, and calculate the ratio of the widths during operation of the system;
 adjust a width of at least one of an address used to read the memory or an address used to write the memory based upon the ratio.

18. The system of claim 17, wherein the ratio detector is further configured to generate a write increment signal specifying a write increment amount and generate a read increment signal specifying a read increment amount, wherein the monitor circuit further comprises:
 a write controller, responsive to receiving a write enable signal from the packet controller, is configured to generate a new write address by incrementing a prior write address by the write increment amount and provide the new write address to a write port of the memory; and
 a read controller, responsive to receiving a read enable signal from the memory mapped slave, is configured to generate a new read address by incrementing a prior read address by the read increment amount and provide the new read address to a read port of the memory.

* * * * *